Patented Sept. 8, 1953

2,651,664

UNITED STATES PATENT OFFICE 2,651,664

PREPARATION OF 2,2,3,3-TETRA-CHLOROBUTANE

Elbert C. Ladd, Passaic, and Herbert Sargent, Glen Rock, N. J., assignors to United States Rubber Company, New York, N. Y., a corporation of New Jersey No Drawing. Application April 15, 1949, Serial No. 87,833

1 Claim. (Cl. 260—658)

The invention particularly relates to a novel method for synthesizing 2,2,3,3-tetrachlorobutane which comprises the catalytic hydrogenation of 1,1,1-trichloroethane in alkaline medium. The reaction is as follows:

(1)
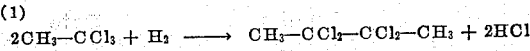
$2CH_3-CCl_3 + H_2 \longrightarrow CH_3-CCl_2-CCl_2-CH_3 + 2HCl$

The reaction is surprising since we have found that some other trichloroethane derivatives, e. g., chloral, and trichloroacetic acid, do not undergo any such coupling reaction.

We have also discovered that the product obtained from reaction (1) will undergo further hydrogenation and dehalogenation:

(2)
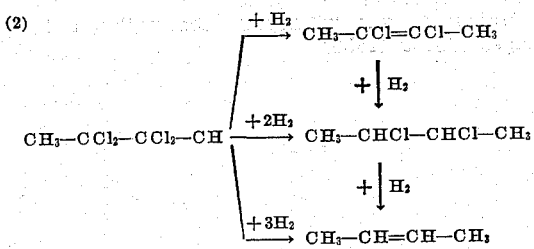

Indeed, the coupling reaction illustrated in (1) above can be carried to any desired further stage as in (2), by control of the amount of hydrogen employed.

In the practice of our invention, the 1,1,1-trichloroethane is shaken with hydrogen in the presence of both a hydrogenation catalyst, e. g., Raney nickel, or platinum or palladium or a compound thereof, particularly an oxide such as platinum oxide, and an acceptor of hydrogen halide, e. g., an alkali such as ammonia, ammonium hydroxide, sodium hydroxide, potassium hydroxide, calcium hydroxide, barium hydroxide, strontium hydroxide, etc., or other alkaline-reacting compound such as sodium carbonate, potassium carbonate, sodium acetate, etc., or any other compound which reacts with hydrogen chloride to neutralize it such as calcium oxide, calcium carbonate, etc. Preference is given those hydrogen halide acceptors which are soluble in an inert diluent such as is suggested below. Ammonia should be avoided when Raney nickel is used as the hydrogenation catalyst because it poisons the catalyst.

The quantity of the hydrogenation catalyst employed is not critical, and amounts in the approximate range of 0.3–7.0 g. per gram-mole of 1,1,1-trichloroethane have generally proven adequate.

The amount of hydrogen halide acceptor employed is preferably at least equivalent to the theoretical quantity of hydrogen chloride to be evolved during the reaction.

The hydrogenation catalyst should, as is conventional in the art of catalytic hydrogenation, be utilized in a highly extended form. Thus it should either be supported on a suitable carrier or support, or be in the porous form as in platinum black and Raney nickel. Details of the preparation of the catalyst for most effective results need not be given because they are well known. Nickel, platinum and palladium form a natural grouping, being the last elements in each of the three groups of transition elements in group VIII of the periodic table. However, we are not limited to the hydrogenation catalysts disclosed, but may use any hydrogenation catalyst.

In the reaction, the absorption of the theoretical quantity of hydrogen usually proceeds smoothly and rapidly at room temperature, i. e., at 20–30° C., typically ca. 25° C., and at atmospheric pressure, hence elevated temperature and superatmospheric pressures are usually unnecessary and may be in fact econimically undesirable. The process of our invention is characterized by its rapidity. It is usually complete in from 5 to 20 hours. The short reaction time, which makes for high productivity, and the ability of the reaction to proceed at atmospheric pressure and at room or ambient temperature, make our process particularly attractive. The statements just made with respect to rapidity of the reaction of our invention at ambient temperature and at atmospheric pressure apply particularly where a platinum hydrogenation catalyst is employed. Where a nickel catalyst is used a higher reaction temperature or pressure or both is often desirable to give a rapid reaction rate.

Thus, while we prefer to carry out the reaction at ambient temperature and at atmospheric pressure, we are not limited thereto but may use higher temperatures, say from 30° to 150° C., or superatmospheric pressures, say up to 1000 pounds per square inch, or both. For example, when using a nickel catalyst we may use a temperature of from 100° to 150° C. and a pressure of from 500 to 1000 p. s. i.

Hydrogen is supplied to the reaction zone as rapidly as it is consumed by the reaction. This may be accomplished by any suitable means obvious to those skilled in the art.

The reaction is facilitated by having present an inert diluent such as water and unreactive organic solvents, particularly those capable of dissolving the hydrogen chloride acceptor, e. g., ethanol. The reaction frequently proceeds more readily in the presence of an organic diluent but the yields of the desired product are often lower than from the corresponding reaction conducted in the presence of water only.

At the end of the reaction, i. e., when approximately the desired theoretical amount of hydrogen (from one to four molar equivalents per two moles of 1,1,1-trichloroethane) has been absorbed, the organic components of the reaction mixture are extracted with an appropriate solvent and the product is isolated from the extract by methods well-known to the art of organic chemistry, e. g., fractional distillation or fractional crystallization.

The 2,2,3,3-tetrachlorobutane so produced is particularly useful as an intermediate for further syntheses, e. g., for the preparation of 2,3-dichlorobutadiene-1,3 by partial dehydrohalogenation. The three product compounds obtained from reactions (2) above may likewise be used for further syntheses; for example, $CH_3-CHCl-CHCl-CH_3$ can be converted to butadiene by dehydrohalogenation.

The following example discloses our invention in more detail.

*Example*

A mixture of 133.5 g. (one mole) of 1,1,1-trichloroethane, 75 ml. of aqueous 15 N ammonia and 0.3 g. of platinum is shaken at 25° C. and atmospheric pressure in an atmosphere of hydrogen for 6 hours during which time about 11,200 ml. (0.5 mole) of hydrogen are absorbed (this being the amount required by reaction (1)).

The reaction mixture is then diluted with water and the organic layer is separated and dried. The latter is then evaporated to remove any unreacted starting material and the residue is recrystallized from methanol to yield 13.0 g. of pure 2,2,3,3-tetrachlorobutane, m. ca. 145° C. (with sublimation); chlorine, 71.82% (theory, 72.45%).

Having thus described our invention, what we claim and desire to protect by Letters Patent is:

The process of making 2,2,3,3-tetrachlorobutane which comprises shaking 1,1,1-trichloroethane with hydrogen at ambient temperature and at atmospheric pressure in the presence of a platinum hydrogenation catalyst and a hydrogen halide acceptor composed of ammonia dissolved in water until one mole of hydrogen per two moles of 1,1,1-trichloroethane has been absorbed, and recovering 2,2,3,3-tetrachlorobutane from the resulting reaction mixture.

ELBERT C. LADD.
HERBERT SARGENT.

References Cited in the file of this patent

FOREIGN PATENTS

| Number | Country | Date |
|--------|---------|------|
| 966,180 | France | Mar. 1, 1950 |

OTHER REFERENCES

Borsche et al.: "Ber. der deut. chem. Gesell.," vol. 48, pages 452–8 (1915).

Busch et al.: Ibid, vol. 49, pages 1063–9 (1916).

Kelber: Ibid., vol. 50, pages 305–10 (1917).

Meyer: "Synthese der Kohlenstoffverbindungen," part 1, first half, page 3 (1938).

Vavon et al.: "Comptes Rendus," vol. 206, pages 1387–9 (1938).